(12) United States Patent
Jang et al.

(10) Patent No.: US 9,292,804 B2
(45) Date of Patent: Mar. 22, 2016

(54) ENERGY MANAGEMENT SYSTEM WITH USER INTERFACE

(75) Inventors: Jae Hwi Jang, Yongin (KR); Jong Hyun Shin, Suwon (KR); Hyun Soo Park, Seoul (KR); Young Jin Park, Bucheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 916 days.

(21) Appl. No.: 13/302,396

(22) Filed: Nov. 22, 2011

(65) Prior Publication Data

US 2012/0136499 A1 May 31, 2012

(30) Foreign Application Priority Data

Nov. 25, 2010 (KR) .................. 10-2010-0118137
Oct. 31, 2011 (KR) .................. 10-2011-0112113

(51) Int. Cl.
*G06Q 10/00* (2012.01)
*G06Q 50/06* (2012.01)

(52) U.S. Cl.
CPC ............. *G06Q 10/00* (2013.01); *G06Q 50/06* (2013.01)

(58) Field of Classification Search
CPC ............ G05D 3/12; G06Q 50/06; G06F 1/32; H04L 69/04; H02J 9/005; H02J 3/14; Y04S 20/222; Y04S 20/242
USPC ............ 700/90, 276, 296, 297, 291; 713/310, 713/320; 323/318; 307/118
See application file for complete search history.

(56) References Cited

U.S. PATENT DOCUMENTS

| | | | |
|---|---|---|---|
| 7,441,135 B1 * | 10/2008 | Chan et al. ................. | 713/320 |
| 7,660,649 B1 * | 2/2010 | Hope et al. ................. | 700/295 |
| 8,204,713 B2 * | 6/2012 | Blick ......................... | 702/179 |
| 2005/0096797 A1 * | 5/2005 | Matsubara et al. ......... | 700/291 |
| 2011/0166710 A1 * | 7/2011 | Kordik et al. .............. | 700/277 |
| 2011/0196547 A1 * | 8/2011 | Park et al. .................. | 700/296 |
| 2011/0208369 A1 * | 8/2011 | Yang et al. ................. | 700/296 |
| 2011/0218680 A1 * | 9/2011 | Kim et al. .................. | 700/276 |
| 2011/0251731 A1 * | 10/2011 | Yang et al. ................. | 700/296 |
| 2013/0013124 A1 * | 1/2013 | Park et al. .................. | 700/296 |
| 2013/0060391 A1 * | 3/2013 | Deshpande et al. ........ | 700/291 |

* cited by examiner

*Primary Examiner* — Sean Shechtman
*Assistant Examiner* — Steven Garland
(74) *Attorney, Agent, or Firm* — Staas & Halsey LLP

(57) ABSTRACT

An energy management apparatus and a user interface method thereof, an electric device controlled by the energy management apparatus, and an energy management apparatus including the same are disclosed. A user interface that intuitively and simply displays a user input for controlling energy consumption of the electric device and a degree of inconvenience that a user experiences when the electric device operates according to the user input is provided to allow the user to be intuitively aware of the degree of inconvenience due to the user input, thereby enabling more intuitive user interaction.

31 Claims, 10 Drawing Sheets

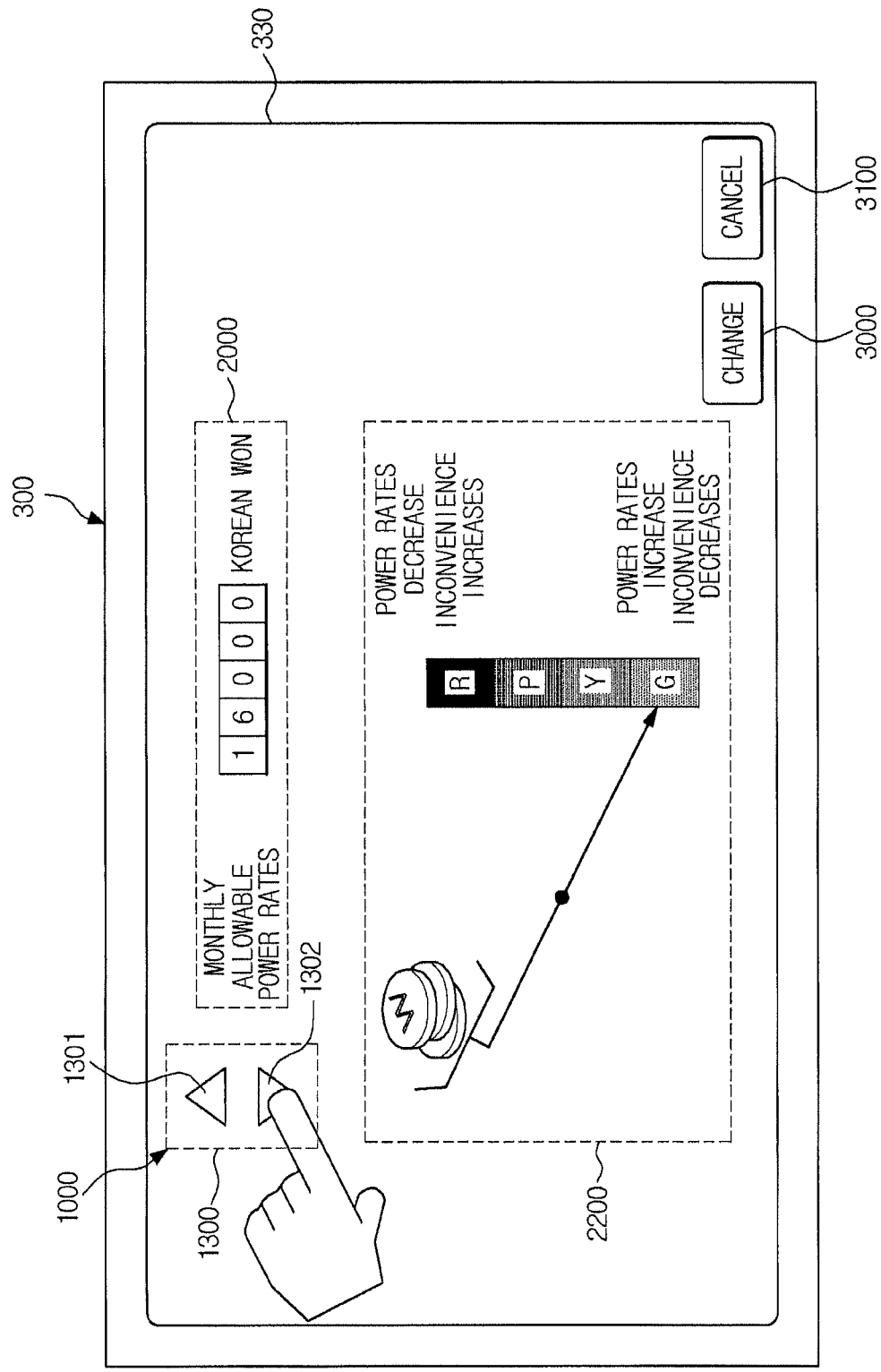

ENERGY MANAGEMENT SYSTEM WITH USER INTERFACE

CROSS-REFERENCE TO RELATED APPLICATIONS

This application claims the priority benefit of Korean Patent Application No. 10-2010-0118137, filed on Nov. 25, 2010 and Korean Patent Application No. 10-2011-0112113, filed on Oct. 31, 2011 in the Korean Intellectual Property Office, the disclosures of which are incorporated herein by reference.

BACKGROUND

1. Field

Embodiments relate to an energy management apparatus and a user interface method thereof, an electric device, and an energy management system having the same.

2. Description of the Related Art

A smart grid is a new concept power grid that grafts information and communications technology onto a one-way power supply structure composed of power generation, power transmission, power distribution, and sale to allow a power provider and a consumer to exchange information in real time in an interactive manner to optimize energy efficiency.

The smart grid is composed of a utility company, a service provider, a smartmeter, an energy management apparatus (EMS), and an electric device that is a power consuming apparatus. A smart grid in a simpler or more complicated structure may be proposed through a combination of the above components or with the addition of other components as necessary.

The EMS is an apparatus that optimizes energy use of an electric device in a home by monitoring the energy use of the electric device, setting and controlling the energy use of the electric device manually or automatically, and taking an appropriate measure such as alarming, cutoff, etc. in the event of an emergency.

When real-time pricing is applied to the smart grid, a number of various cases are generated, and thus decision-making according to the EMS is more important than direct intervention of a user for optimization in all cases.

If user input (such as restrictions, preferences, etc.) is limited in decision making of the EMS, a desired electric device cannot be operated to suit a user's taste because the EMS may make a decision contrary to a user's desires.

Particularly, a conventional system cannot inform a user of the influence of a user input through the EMS on an operation of an electric device and a degree of inconvenience that the user encounters, compared with power rates, when using the electric device.

Therefore, it is difficult to induce an active interaction between a power provider and a user in order to decrease power rates for a user who is willing to accept some inconvenience.

SUMMARY

Therefore, it is an aspect to provide an energy management apparatus and a user interface method thereof for controlling energy use of an electric device and a degree of inconvenience that a user encounters when the electric device is operated by the user in an intuitive and simple manner, an electric device controlled by the energy management apparatus, and a energy management system having the same.

Additional aspects will be set forth in part in the description which follows and, in part, will be obvious from the description, or may be learned by practice of the invention.

In accordance with one aspect, a method of interfacing with an energy management apparatus controlling an energy level of an electric device includes: displaying a graphical user interface (GUI) element for inputting at least one of a weighted index that represents a relative increase or decrease between power rates and inconvenience of the electric device and monthly allowable power rates on a screen; receiving at least one of the weighted index and the monthly allowable power rates from a user through the displayed GUI element; and displaying inconvenience information representing inconvenience that the user experiences when the electric device operates at an energy level determined on the basis of the at least one of the weighted index and the monthly allowable power rates input through the GUI element on the screen.

The GUI element may include at least one of a slide bar and a rotary dial, and the weighted index may be input by using the slider bar or the rotary dial.

The inconvenience information may include an inconvenience index that represents a degree of inconvenience that the user experiences, wherein the inconvenience index has a low value when the input weighted index is higher than a reference weighted index and a high value when the input weighted index is lower than the reference weighted index.

The inconvenience information may include an inconvenience index that represents a degree of inconvenience that the user experiences, wherein the inconvenience index has a low value when the input monthly allowable power rates are higher than reference power rates and has a high value when the input monthly allowable power rates are lower than the reference power rates.

The reference power rates may correspond to monthly allowable power rates that can be generated when an electric device is operated at a desired time, or monthly allowable power rates that can be generated when the electric device is used regardless of variable power rates.

The displaying of the inconvenience information may include indicating a recommended value on a manipulating path of the slide bar or rotary dial to help a user to input the weighted index using the GUI element.

The recommended value may include at least one of an average weighted index of users in the same environment and an average of weighted indexes used by the user for a predetermined period of time.

The recommended value may include at least one of average power rates of users in the same environment and an average of power rates paid by the user.

The GUI element may include a control button, and the monthly allowable power rates may be input by using the control button.

The inconvenience information may include an energy use index that represents a degree of inconvenience that the user experiences as a color, wherein the energy use index is indicated in a first color when the input monthly allowable power rates exceed reference power rates and is indicated in a second color when the input monthly allowable power rates are below the reference power rates.

The energy use index may be indicated where the first color is red and the second color is green.

In accordance with another aspect, a method of interfacing with an energy management apparatus controlling an energy level of an electric device includes: receiving at least one of a weighted index that represents a relative increase or decrease between power rates and inconvenience of the electric device and monthly allowable power rates on a screen; and displaying inconvenience information representing a degree of inconvenience that the user experiences when the electric device operates at an energy level determined on the basis of the at least one of the input weighted index and the monthly allowable power rates.

In accordance with another aspect, an energy management apparatus controlling an energy level of an electric device includes a screen displaying a GUI element for inputting at least one of a weighted index that represents a relative increase or decrease between power rates and inconvenience of the electric device and monthly allowable power rates on a screen, and a controller receiving at least one of the weighted index and the monthly allowable power rates from a user through the displayed GUI element, and displaying inconvenience information representing a degree of inconvenience that the user experiences when the electric device operates at an energy level determined on the basis of the at least one of the weighted index and the monthly allowable power rates input through the GUI element on the screen.

The screen of the energy management apparatus may be a touch screen.

The GUI element of the screen may correspond to at least one of a slide bar and a rotary dial through which the weighted index is input.

The inconvenience information may include an inconvenience index that represents a degree of inconvenience that the user experiences, wherein the controller controls the inconvenience index to decrease as the input weighted index exceeds a reference weighted index and to increase as the input weighted index is below the reference weighted index.

The inconvenience information may include an inconvenience index that represents a degree of inconvenience that the user experiences, wherein the controller controls the inconvenience index to decrease as the input power rates exceed reference power rates and to increase as the input power rates are below the reference power rates.

The reference power rates may correspond to power rates that can be generated when an electric device is operated at a desired time, or power rates that can be generated when the electric device is used regardless of variable power rates.

The controller may control a recommended value to be displayed on the screen to help input the weighted index or power rates using the GUI element.

The recommended value may include at least one of an average weighted index of users in the same environment and an average of weighted indexes used by the user for a predetermined period of time.

The recommended value may include at least one of average power rates of users in the same environment and an average of power rates paid by the user.

The GUI element of the screen may include a control button by which the power rates are input.

The inconvenience information may include an energy use index that represents a degree of inconvenience that the user experiences as a color, wherein the energy use index is indicated in a first color (for example, red) when the input power rates exceed reference power rates and is indicated in a second color (for example, green) when the input power rates are below the reference power rates.

In accordance with another aspect, an energy management system controlling an energy level of an electric device includes an input unit receiving a weighted index that represents a relative increase or decrease between power rates and inconvenience of the electric device or monthly allowable power rates, a controller displaying inconvenience information representing a degree of inconvenience that the user experiences when the electric device operates at an energy level determined on the basis of the input weighted index or monthly allowable power rates, and a display unit displaying the inconvenience information according to a control signal from the controller.

In accordance with another aspect, an electric device includes a receiver receiving information regarding an energy level corresponding to a weighted index that represents a relative increase or decrease between power rates and inconvenience of the electric device from an energy management apparatus that displays a GUI element for inputting the weighted index on a screen, receives the weighted index from a user through the displayed GUI element, determines an energy level corresponding to the input weighted index, and displays inconvenience information representing a degree of inconvenience that the user experiences when the electric device operates at the determined energy level on the screen, a controller controlling energy output of the electric device on the basis of the energy level information received through the receiver, and a load driver driving loads in response to a control signal of the controller.

In accordance with another aspect, a power management apparatus includes an energy management apparatus including a screen that displays a GUI element for inputting a weighted index that represents a relative increase or decrease between power rates and inconvenience of the electric device on a screen, and a controller that receives the weighted index from a user through the displayed GUI element, determines an energy level corresponding to the input weighted index, and displays inconvenience information representing a degree of inconvenience that the user experiences when the electric device operates at the determined energy level on the screen, and an electric device including a receiver that receives information regarding the determined energy level, a controller that controls energy output of the electric device on the basis of the energy level information received through the receiver, and a load driver that drives loads in response to a control signal of the controller.

In accordance with one aspect, a user interface for controlling energy use of an electric device and a degree of inconvenience that a user experiences when the electric device is operated by the user in an intuitive and simple manner can be provided so as to display a degree of inconvenience the user experiences due to an operation delay or performance delay of the electric device when the electric device is operated by the user through intuitive visualization. Accordingly, it is possible to help the user determine whether to reduce inconvenience of use of the electric device though power rates increase or to decrease power rates even though inconvenience increases, to thereby efficiently control the electric device to suit to a user's situation.

BRIEF DESCRIPTION OF THE DRAWINGS

These and/or other aspects will become apparent and more readily appreciated from the following description of the embodiments, taken in conjunction with the accompanying drawings of which:

FIGS. 6A and 6B are views explaining an operation of inputting power rates through a control button type GUI element for inputting power rates and displaying an energy user index depending on the input power rates in the energy management apparatus of the energy management system according to an embodiment.

DETAILED DESCRIPTION

Figure 1:
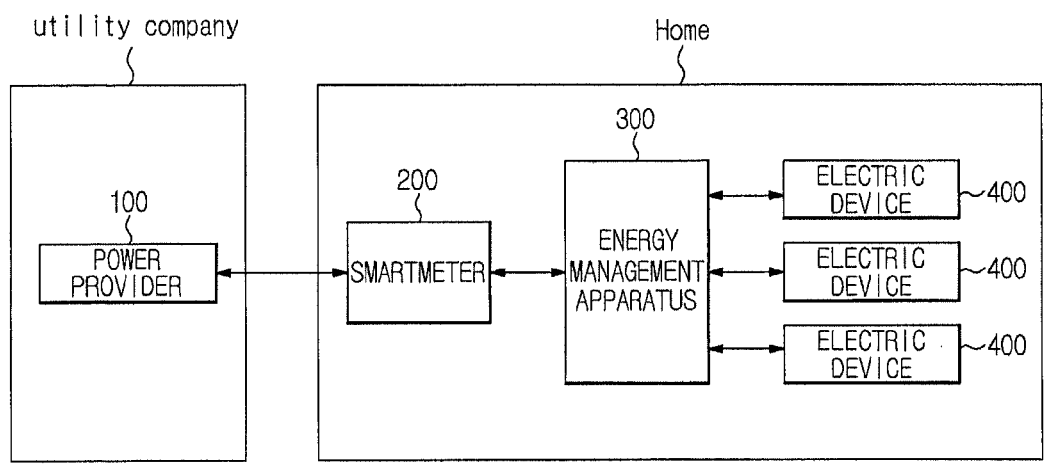
FIG. 1 is a block diagram of a energy management system according to an embodiment.

Reference will now be made in detail to the embodiments, examples of which are illustrated in the accompanying drawings, wherein like reference numerals refer to like elements throughout.

Figure 2:
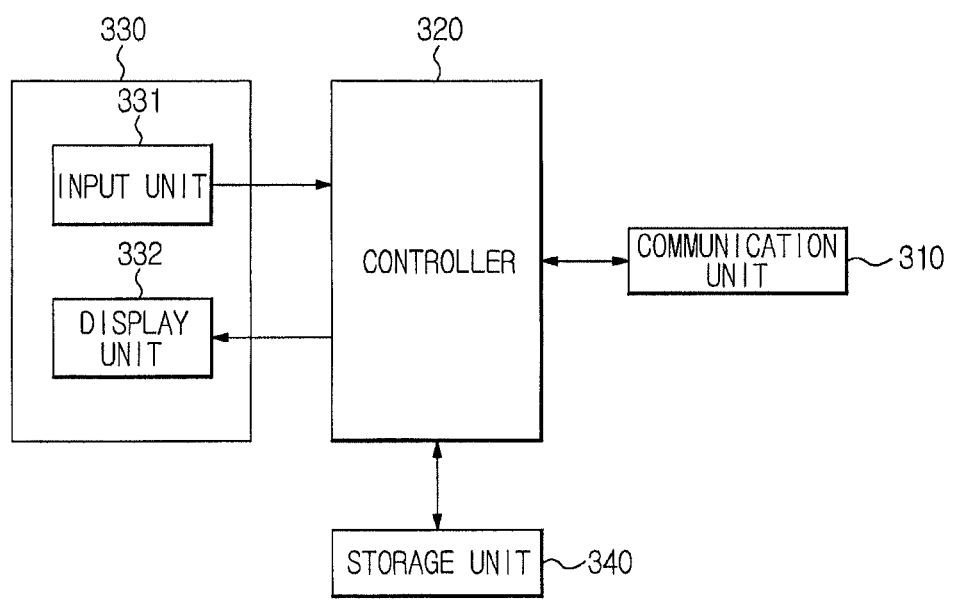
FIG. 2 is a block diagram of an energy management apparatus of the energy management system according to an embodiment.

FIG. 1 is a block diagram of a energy management system according to an embodiment and FIG. 2 is a block diagram of an energy management apparatus of the energy management system according to an embodiment.

Referring to FIG. 1, the energy management system includes a power provider 100 of a utility company, a smartmeter 200, an energy management apparatus 300, and electric devices 400 corresponding to power consuming apparatuses. The energy management system may have a simpler or more complicated structure through combination of the above components or through addition of other components as necessary.

The power provider 100 is a power supply source that is operated by the utility company to generate and supply power. The power provider 100 generates the power through solar power, atomic energy, hydroelectric power, geothermal power, wind power, etc., and provides the generated power to electric devices 400 set in a home.

Here, while a predetermined amount of power is generated and supplied to the electric devices 400 in the home, the amount of power consumed in the home largely varies depending on time periods. For example, power consumption in the home is lower at dawn or in the morning than in the evening and lower in spring and autumn than in summer and winter.

Accordingly, the power provider 100 determines power rates in a low power consumption period to be lower than power rates in a high power consumption period and determines power rates of a low power consumption season to be lower than power rates of a high power consumption season.

In this manner, the power provider 100 elastically sets power rates in response to power consumption in the home and provides power to the home at these elastic power rates, thereby balancing supply and demand.

The power provider 100 predicts power consumption on the basis of the generation amount of electric power, information about past power consumption for every season and every period, and weather information, and then determines power rates. In this case, it may also be possible to establish a power rate level corresponding to the power rates as necessary.

The power provider 100 collects power consumption amounts of individual homes classified according to individual power rate levels and stores the collected power consumption amounts, such that the utility company calculates power rates depending upon power consumption for power rate levels of each home per month, and charges each home the calculated power rates on a monthly basis.

The power provider 100 compares periodically calculated power rates with monthly allowable power rates to determine restriction of the power supply and, if the calculated power rates exceed the monthly allowable power rates, transmits information about the excess of the monthly allowable power rates to the energy management apparatus 300 installed in the corresponding home, such that an event indicating an excess of monthly allowable power rates is generated through the energy management apparatus 300 in each home.

The power provider 100 stores a threshold power amount for each home and compares a power consumption amount with the threshold power amount for each home to determine restriction of the power supply.

As described above, the power provider 100 manages power demand of each home on the basis of the threshold power amount or monthly allowable power rates. Here, the threshold power amount for restricting power supply of each home is arbitrarily set by the utility company or determined by a contract between each home and the utility company. In addition, the monthly allowable power rates of each home are set by a contract between each home and the utility company.

The power provider 100 stores and manages information regarding the details of generation of a threshold power rate excess event and a power consumption state depending on generation of a monthly allowable power rate excess event for each home.

The power provider 100 is connected to the smartmeter 200, the energy management apparatus 300 and the electric devices 400 installed in each home through a network to transmit and receive information regarding power demand management. This network may be any of a wired network, a wireless network, or a wired/wireless hybrid network, for example.

The smartmeter 200 is an electronic watt-hour meter that is installed in each home, displays a power amount consumed in each home through a display such as a liquid crystal display (LCD), and performs bi-directional communication with the power provider 100 and the energy management apparatus 300 to transmit the power amount to the power provider 100 and the energy management apparatus 300.

The smartmeter 200 receives power rate information transmitted from the power provider 100, displays the power rate information such that a user can view it, and transmits the power rate information to the energy management apparatus 300.

The energy management apparatus (EMS) is also called a demand response (DR) controller, monitors energy use of an electric device, sets and controls energy use of the electric device, such as energy level, manually or automatically, and takes an appropriate measure such as alarming, cutoff, etc. in the event of an emergency to thereby optimize utilization of energy.

The EMS 300 communicates with the smartmeter 200 to receive power rates and a price level corresponding to the power rates from the smartmeter 200, communicates with each electric device 400 to receive energy information of the electric device 400 from the electric device 400, and controls operation of the electric device 400 in such a manner that the EMS 300 controls the energy level of the electric device 400 on the basis of the price level of the power provider 100, the energy information of the electric device 400, and monthly allowable power rates set by the user.

The EMS 300 receives threshold power amount excess information and monthly allowable power rate excess information from the power provider 100 and informs the user of the received information.

The EMS 300 changes the energy level of the electric device 400 to an optimized energy level depending on reference power rates and controls the operation of the electric device 400 such that the electric device 400 is operated within a range in which the monthly allowable power rates do not exceed the reference power rates. The reference power rates correspond to monthly allowable power rates that can be generated when the user operates a desired electric device at a desired time or monthly allowable power rates that can be generated when the user uses an electric device irrespective of variable power rates, and are calculated by the EMS 300.

For example, the reference power rates may be monthly allowable power rates set by a contract between the user and the utility company such that the electric device 400 is operated within a range in which power rates caused by the operation of the electric device 400 do not exceed the monthly allowable power rates.

The EMS 300 displays a screen for inputting a weighted index that represents a relative increase or decrease of power rates and inconvenience of the electric device 400, receives a weighted index from the user through the displayed screen, and displays inconvenience information representing inconvenience that the user experiences caused by operation variation such as energy level variation in the electric device 400 due to a weighted index difference when the electric device 400 is operated based on the weighted index input by the user, instead of a reference weighted index (or a previous weighted index) when the weighted index is input through the screen. At this time, when the weighted index is changed, the EMS 300 optimizes the energy level of the electric device 400 to an energy level that does not exceed power rates corresponding to the changed weighted index or an energy level corresponding to the changed weighted index and controls the operation of the electric device 400.

Furthermore, the EMS 300 displays a screen for inputting monthly allowable power rates of the electric device 400, receives the monthly allowable power rates from the user through the displayed screen, and displays inconvenience information representing inconvenience that the user experiences caused by operation variation such as energy level variation in the electric device 400 due to a power rate difference when the electric device 400 is operated based on the monthly allowable power rates input by the user, instead of the monthly allowable power rates set based on a contract with the utility company or the reference power rates when the monthly allowable power rates are input. Here, when the monthly allowable power rates are changed, the EMS 300 optimizes the energy level of the electric device 400 to an energy level that does not exceed the changed monthly allowable power rates or an energy level corresponding to the changed monthly allowable power rates and controls the operation of the electric device 400.

Referring to FIG. 2, the EMS 300 includes a communication unit 310, a controller 320, a screen 330, and a storage unit 340.

The communication unit 310 communicates with the smartmeter 200 to receive power rate information and price level information corresponding to power rates from the smartmeter 200 and transmits the received information to the controller 320.

Here, the power rates and price level information correspond to daily power rates and price level information for each period or current power rates and current price level information.

In addition, the communication unit 310 communicates with the electric device 400 to receive information on the electric device 400 from the electric device 400, transmits the information to the controller 320, and sends energy level information from the controller 320 to the electric device 400.

Here, the information on the electric device 400 includes the name and power information of the electric device 400. The power information includes information such as operation level, peak instantaneous power, average power consumption, or information on an operation time during which power is consumed, for example. The energy level information includes information about an energy level for operating the electric device 400.

The screen 330 includes an input unit 331 that receives and processes a signal input by the user and a display unit 332 for screen display. The screen 330 may be a touch screen.

The input unit 331 includes a touch panel that senses user touch, recognizes a touch point, a moving direction, and a touch count corresponding to a touch signal sensed by the touch panel, and provides the recognized information to the controller 320. The touch panel of the input unit 331 can sense a signal representing a touch point. This touch panel is implemented by a transparent panel having a touch-sensing plane mounted on a visible surface of the display unit 332, for example, an LCD, to form the touch screen.

The input unit 331 senses a touch input and provides sensed touch point information to the controller 320.

The input unit 331 can sense touch input based on touch and release of touch by a finger of the user or a tool. Here, when sensing a touch, the input unit 331 transmits coordinates corresponding to a point of the sensed touch to the controller 320.

For example, the input unit 331 of the touch screen 330 adopting a capacitive method includes capacitance switches such as condensers for respective pixels of the display unit 332 in order to confirm capacitance variation. Coordinates for confirming a sensed touch point are allocated to each pixel.

When capacitance variation occurs due to a touch, the input unit 331 confirms a capacitance switch from which the capacitance variation is sensed. In addition, the input unit 331 transmits coordinates corresponding to a point at which the confirmed capacitance switch is located to the controller 320.

In particular, the input unit 331 receives a weighted index or monthly allowable power rates from the user through various GUI elements (such as a slide bar, a rotary dial, or a control button, for example) displayed on a screen such that the user inputs the weighted index or monthly allowable power rates through the GUI elements.

The display unit 332 includes an LCD for displaying a screen, converts a data signal provided by the controller 320 into a video signal that can be displayed on the LCD and displays the video signal on the LCD. The display unit 332 may use a PDP, OLED, etc. in addition to the LCD.

Particularly, the display unit 102 displays a first screen on which a GUI element for inputting a weighted index or monthly allowable power rates is displayed and a second screen on which inconvenience information depending on the weighted index or monthly allowable power rates input by the user is displayed. Here, the first and second screens may be integrated and displayed as one screen or respectively displayed in a separate manner.

The controller 320 displays the screen for inputting a weighted index or monthly allowable power rates on the screen 330 at the request of the user and, when the user inputs a desired weighted index or monthly allowable power rates through the screen, displays inconvenience information representing that the user experiences due to energy level variation in the electric device 400 when the electric device 400 is operated on the basis of the weighted index or monthly allowable power rates, input by the user, instead of the reference weighted index or reference power rates. The inconvenience information may include an inconvenience index that represents a degree of inconvenience that the user experiences due to energy level variation in the electric device 400 when the electric device 400 is operated on the basis of the weighted index or monthly allowable power rates, input by the user, instead of the reference weighted index or reference power rates and an energy use index that represents the degree of inconvenience as a color.

For example, the controller 320 calculates a difference between the weighted index or monthly allowable power rates input by the user and the reference weighted index or reference power rates, determines a degree of inconvenience based on the difference, and displays the determined degree of inconvenience on the screen 330. The reference weighted index is a weighted index that can be generated when the user operates the electric device at a desired time or a weighted index that can be generated when the user uses the electric device irrespective of variable power rates. The reference power rates are monthly allowable power rates that can be generated when the user operates the electric device at a desired time or monthly allowable power rates that can be generated when the user uses the electric device irrespective of the variable power rates.

Accordingly, a user interface capable of intuitively visualizing a degree of inconvenience the user experiences due to the energy level variation in the electric device 400 when the user decreases the weighted index or monthly allowable power rates to lower than the reference weighted index or reference power rates (for example, power rates set by a contract with the utility company) is implemented so as to allow the user to be intuitively aware of the degree of inconvenience that the user experiences when changing the weighted index or monthly allowable power rates, thereby inducing the user to additionally pay power rates for or benefit from a cost increase or satisfaction decrease that the user can accept.

The storage unit 340 stores an inconvenience information value (inconvenience index value or energy use index value) representing that the degree of inconvenience that the user experiences due to a weighted index difference or power rate difference for each weighted index or each power rate. Furthermore, the storage unit 340 may store an inconvenience information value (inconvenience index value or energy use index value) representing that the degree of inconvenience that the user experiences due to a weighted index difference or power rate difference for each weighted index difference or each power rate difference.

For example, an inconvenience index may have a value proportional to a difference between the weighted index input by the user and the reference weighted index or a difference between the monthly allowable power rates input by the user and the reference power rates. That is, the inconvenience index may increase as the weighted index difference increases and decrease as the weighted index difference decreases.

For example, the inconvenience index may be previously set to a specific value for each weighted index decrement or each power rate decrement. The inconvenience index is 0% when the weighted index decrement or power rate decrement is 0%, 10% when it is 10%, 20% when it is 20%, 30% when it is 30%, 40% when it is 40%, 50% when it is 50%, 60% when it is 60%, 70% when it is 70%, 80% when it is 80%, 90% when it is 90%, and 100% when it is 100%.

Moreover, the inconvenience index may be previously set to a specific value for each weighted index decrement or each power rate increment. In this case, the inconvenience index can be increased by a weighted index decrement or power rate increment. For example, the inconvenience index may be 150% when the weighted index decrement or power rate increment is 50%.

In addition, the inconvenience index may be set to a variable value depending on a weighted index decrement or power rate increment/decrement. In this case, the inconvenience index may be predetermined or arbitrarily adjusted by the user.

When the weighted index or monthly allowable power rates are changed, the controller 320 changes the power level of the electric device 400 to an optimized power level based on the changed weighted index or changed monthly allowable power rates and controls the operation of the electric device 400 such that the electric device 400 is operated within a range within which power consumption of the electric device 400 does not exceed the changed weighted index or monthly allowable power rates.

Figure 3:
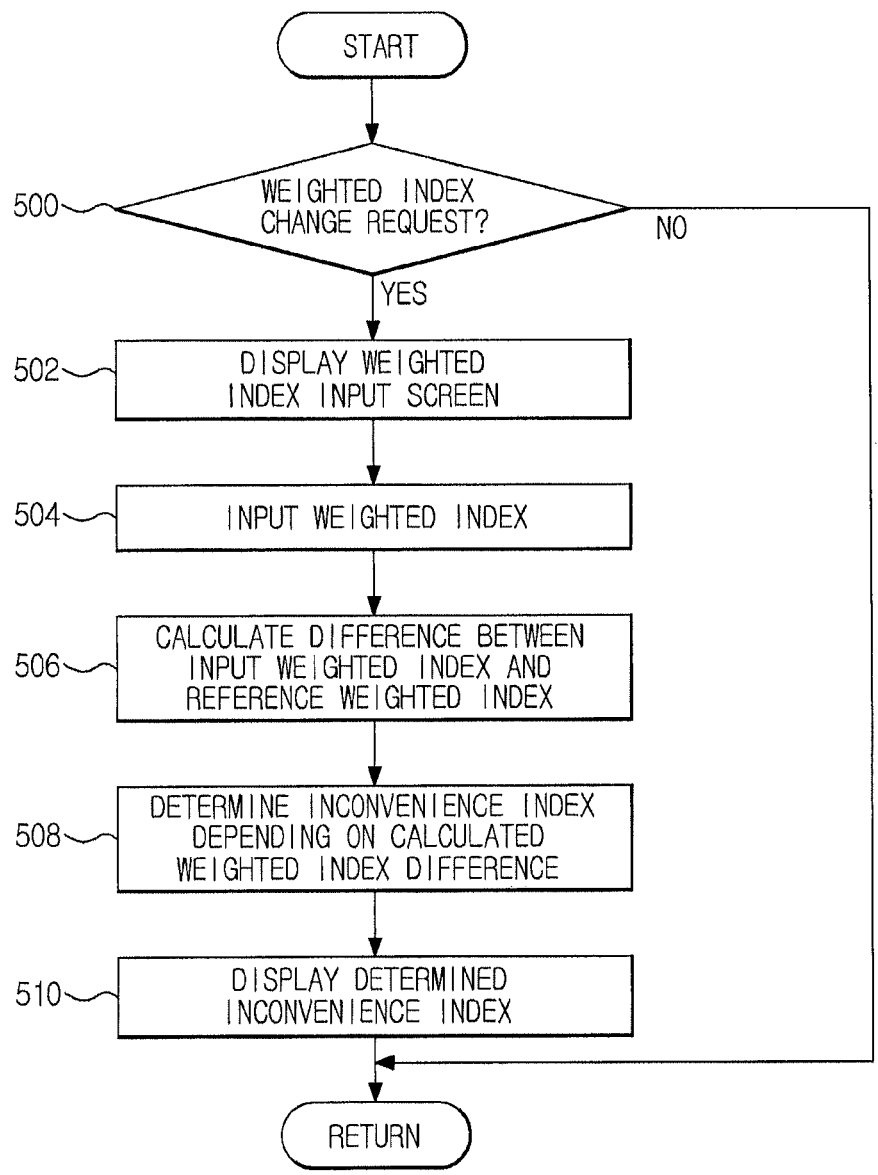
FIG. 3 is a flowchart illustrating a control operation of the energy management apparatus of the energy management system according to an embodiment.

FIG. 3 is a flowchart illustrating a control operation of the EMS of the energy management system according to an embodiment.

Referring to FIG. 3, the controller 320 determines whether the user requests a weighted index to be changed in operation mode 500.

Upon determining that the user requests the weighted index to be changed in operation mode 500, the controller 320 displays a screen for inputting a weighted index on the display unit 332 of the screen 330 (502).

The user inputs a changed weighted index by using the GUI element for inputting power rates, displayed on the screen 330, upon display of the screen for inputting a weighted index.

The controller 320 receives the weighted index input by the user in operation mode 504.

Upon input of the weighted index by the user, the controller 320 calculates a difference between the weighted index input by the user and the reference weighted index in operation mode 506.

Then, in operation 508, the controller 320 determines an inconvenience index based on the calculated weighted index difference using an inconvenience index value previously stored in the storage unit 340 for each weighted index difference.

Upon determination of the inconvenience index, the controller 320 displays the determined inconvenience index on the screen 330 in operation mode 510.

Accordingly, when the user decreases the weighted index to below the reference weighted index, a degree of inconvenience that the user experiences due to operation variation such as operation delay or performance delay of the electric device 400 can be indexed and shown to the user through intuitive visualization so as to allow the user to be intuitively aware of a degree of satisfaction that the user will sacrifice depending on the weighted index decrement, thereby inducing the user to gain a power rate benefit from a degree of inconvenience the user can accept.

When the weighted index change is decided, the controller 320 changes the energy level of the electric device 400 to an optimized power level such that the electric device 400 is operated in a range in which power consumption of the electric device 400 does not exceed monthly allowable power rates corresponding to the weighted index input by the user, or controls the operation of the electric device such that the electric device 400 is operated at an energy level corresponding to the weighted index input by the user.

The control operation of the EMS according to an embodiment will be explained in detail.

The EMS 300 is restricted in controlling the electric device 400 mostly by a reduction of convenience (which includes the concepts of satisfaction, comfort, etc.) and an increase of inconvenience which may be caused by a cost threshold (monthly allowable power rates) that the user can pay and differential distribution of energy.

First of all, a method for displaying an inconvenience index when the user changes a weighted index or monthly allowable power rates to inform the user of a degree of inconvenience that the user experiences due to the weighted index change or monthly allowable power rate change is described.

Expense and inconvenience are inversely proportional to each other, in general. In other words, when a user desires to pay high power rates, a probability that the user submits to inconvenience is decreased.

Since differential electricity pricing is employed in a smart grid in order to restrict power consumption concentrated within a specific time period, enormous power rates should be paid only if convenience is taken into consideration without considering cost. In view of this, general users request energy management in consideration of both cost and inconvenience, and thus it is important for the EMS to seek a compromise between cost and inconvenience. The compromise may largely depend on variables such as the financial situation of a user, the scale of a building, the types of electric devices operating in connection with each other, or a user's lifestyle, for example, and thus the compromise is determined on the basis of direct user input.

Figure 4A:
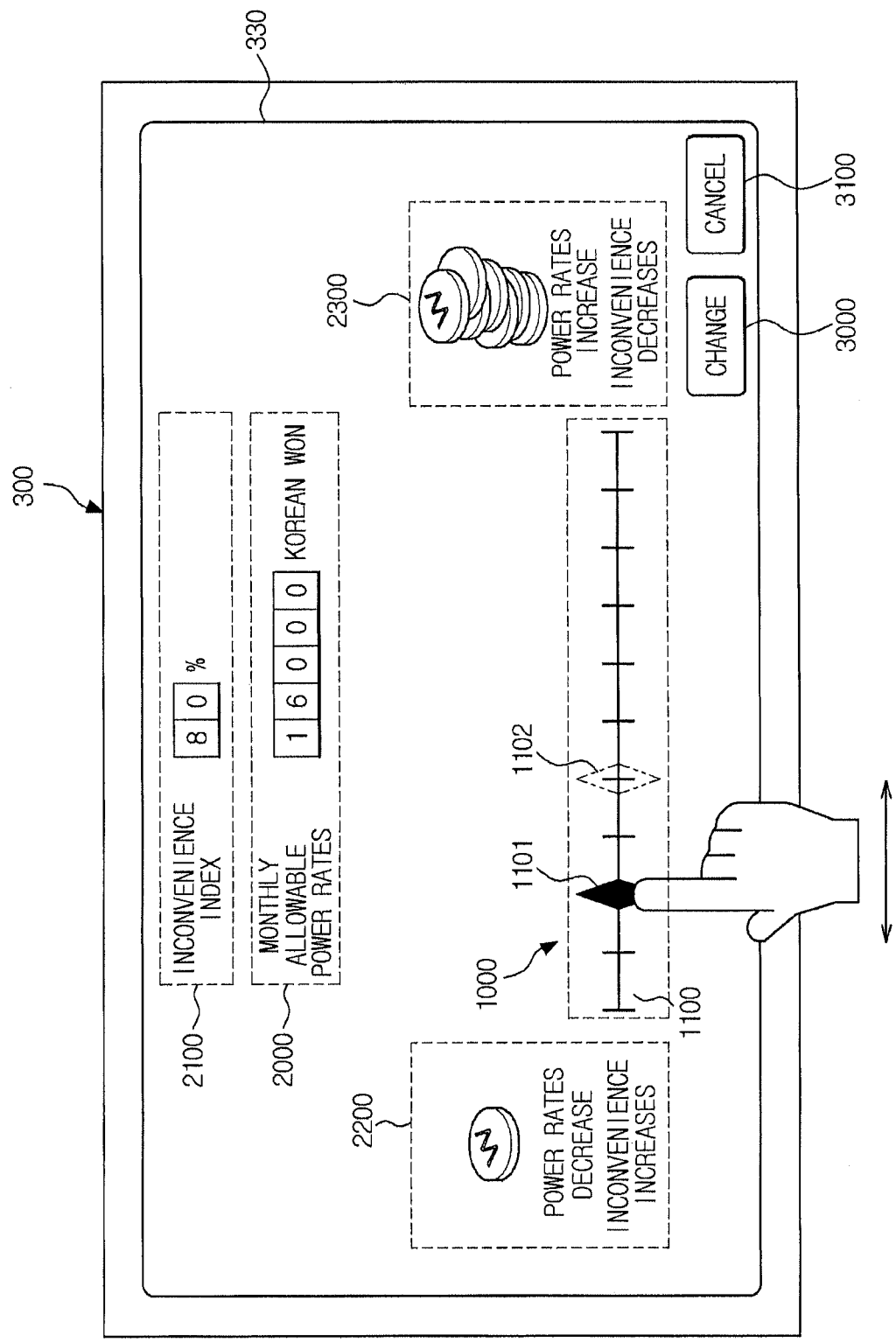
FIGS. 4A and 4B are views explaining an operation of inputting a weighted index through a slide bar type Graphical User Interface (GUI) element for inputting a weighted index and displaying an inconvenience index depending on the input weighted index in the energy management apparatus of the energy management system according to an embodiment.
Figure 4B:
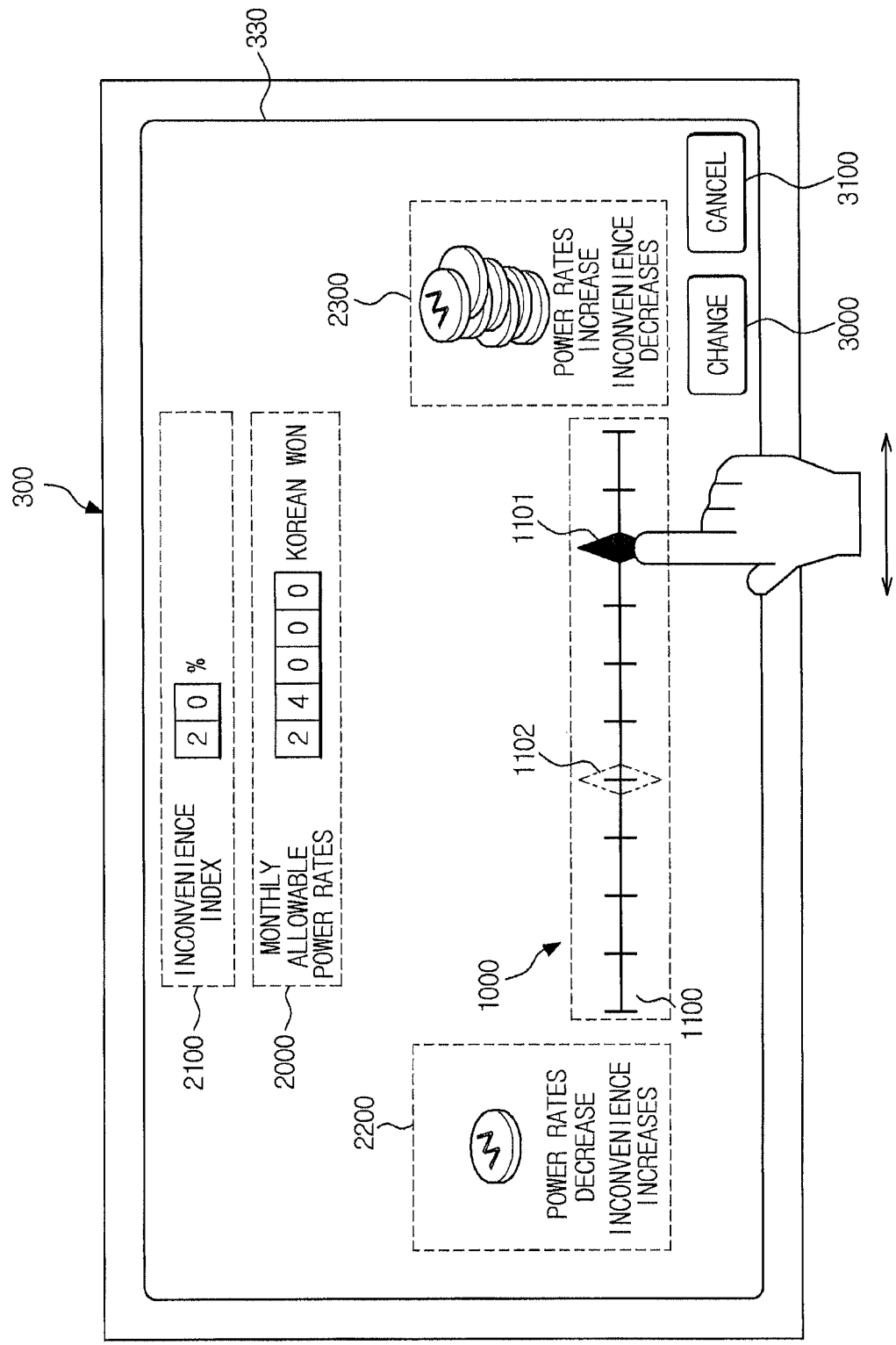

FIGS. 4A and 4B are views for explaining an operation of inputting a weighted index through a slide bar type GUI element for inputting a weighted index and displaying an inconvenience index depending on the input weighted index in the EMS of the energy management system according to an embodiment.

As shown in FIGS. 4A and 4B, the screen 330 of the EMS 300 includes a GUI element 1000 through which a user inputs a weighted index, a power rate indication element 2000 for indicating monthly allowable power rates corresponding to the weighted index input by the user through the GUI element 1000, and an inconvenience index indication element 2100 for indicating an inconvenience index based on the weighted index input through the GUI element 1000.

The GUI element 1000 may be implemented as a slide bar 1100 having a bar 1101 moving according to user input. The slide bar 1100 is a universal input interface for inputting continuously set values. The slide bar 1100 has advantages in that most users can intuitively use it and do not need to learn how to operate it because it is a universal input method. In addition, it is easy to input a value using the slide bar 1100 as compared to a method of directly inputting a value.

The user inputs a weighted index by moving the bar 1101 of the slide bar 1100 to the left or right.

When the weighted index is input in this manner, an inconvenience index corresponding to a difference between the input weighted index and the reference weighted index is displayed on the inconvenience index indication element 2100.

Simultaneously, monthly allowable power rates corresponding to the input weighted index are displayed on the power rate indication element 2000.

In the case where the EMS 300 requests the user to input a weighted index through the slide bar 1100, a point indicated by the moving bar 1101 of the slide bar 1100 may not be distinct. Accordingly, a weighted index and an inconvenience index corresponding to an actually selected point are calculated and indicated at that point such that the user can easily select the weighted index.

The inconvenience index has a value proportional to the difference between the weighted index input by the user and the reference weighted index. That is, the inconvenience index decreases as the weighted index difference decreases and increases as the weighted index difference increases.

For example, the inconvenience index is previously set to a specific value for each power rate decrement. The inconvenience index may be 0% when the weighted index decrement is 0%, 10% when it is 10%, 20% when it is 20%, 30% when it is 30%, 40% when it is 40%, 50% when it is 50%, 60% when it is 60%, 70% when it is 70%, 80% when it is 80%, 90% when it is 90%, and 100% when it is 100%.

If a monthly allowable power bill set by a contract between the user and the utility company is 30,000 Korean Won and the user moves the bar 1101 of the slide bar 1100 to a point corresponding to monthly allowable power rates of 6,000 Korean Won, since the user lowers the monthly allowable power rates from 30,000 Korean Won to 6,000 Korean Won, an inconvenience index value of 80% indicating a weighted index decrement 80% corresponding to the power rate decrement is displayed (refer to FIG. 4A).

If monthly allowable power rates set by the contract between the user and the utility company are 30,000 Korean Won and the user moves the bar 1101 of the slide bar 1100 to a point corresponding to monthly allowable power rates of 24,000 Korean Won, since the user lowers the monthly allowable power rates from 30,000 Korean Won from 24,000 Korean Won, an inconvenience index value of 20% indicating a weighted index decrement 20% corresponding to the power rate decrement is displayed (refer to FIG. 4B).

Accordingly, the user can be intuitively aware of a degree of inconvenience that the user will experience due to the weighted index input by the user, and thus it is possible to induce the user who is willing to accept some inconvenience of this degree to obtain a power rate benefit.

At this time, it is possible to display an image element 2200 for allowing the user to be intuitively aware of power rate decrease/inconvenience increase at one side of the slide bar 1100 to help the user move the bar 1101 of the slide bar 1100, and display an image element 2300 for allowing the user to be intuitively aware of power rate increase/inconvenience decrease at the other side of the slide bar 1100.

Therefore, FIG. 4A shows a case having a high possibility of being selected by a user who cares about power rate reduction rather than convenience improvement, and it can be intuitively determined from FIG. 4A that inconvenience can increase while power rates decrease.

On the contrary, FIG. 4B shows a case having a high probability of being selected by a user who cares about convenience rather than expense, and it can be intuitively known from FIG. 4A that inconvenience can decrease while power rates increase.

Furthermore, a bar 1102 in a dotted line form, which represents a recommended value, may be indicated at a point on the movement section of the bar 1101 of the slide bar 1100. This recommended value may represent an average weighted index actually used by the user for a predetermined period of time or an average weighted index of other people having similar operation environments. That is, if set values of users in the same environment (apartments having the same size, the same area, etc.) can be shared, an average of the set values of the users can be indicated as a recommended value on the slide bar 1100 such that the users can compare the set values. The recommended value is previously stored in the storage unit 340. Furthermore, the recommended value may be updated in real time through a network.

When the change to the weighted index input by the user is decided, the user presses a change button 3000 on the screen to fix the weighted index change. When the weighted index change is cancelled, the user presses a cancel button 3100 to cancel the weighted index change.

Upon decision of the weighted index change, the controller 320 controls the operation of the electric device 400 such that the electric device 400 operates within a range in which power consumption thereof does not exceed monthly allowable power rates corresponding to the weighted index input by the user or the electric device 400 operates at an energy level corresponding to the weighted index input by the user.

Figure 5A:
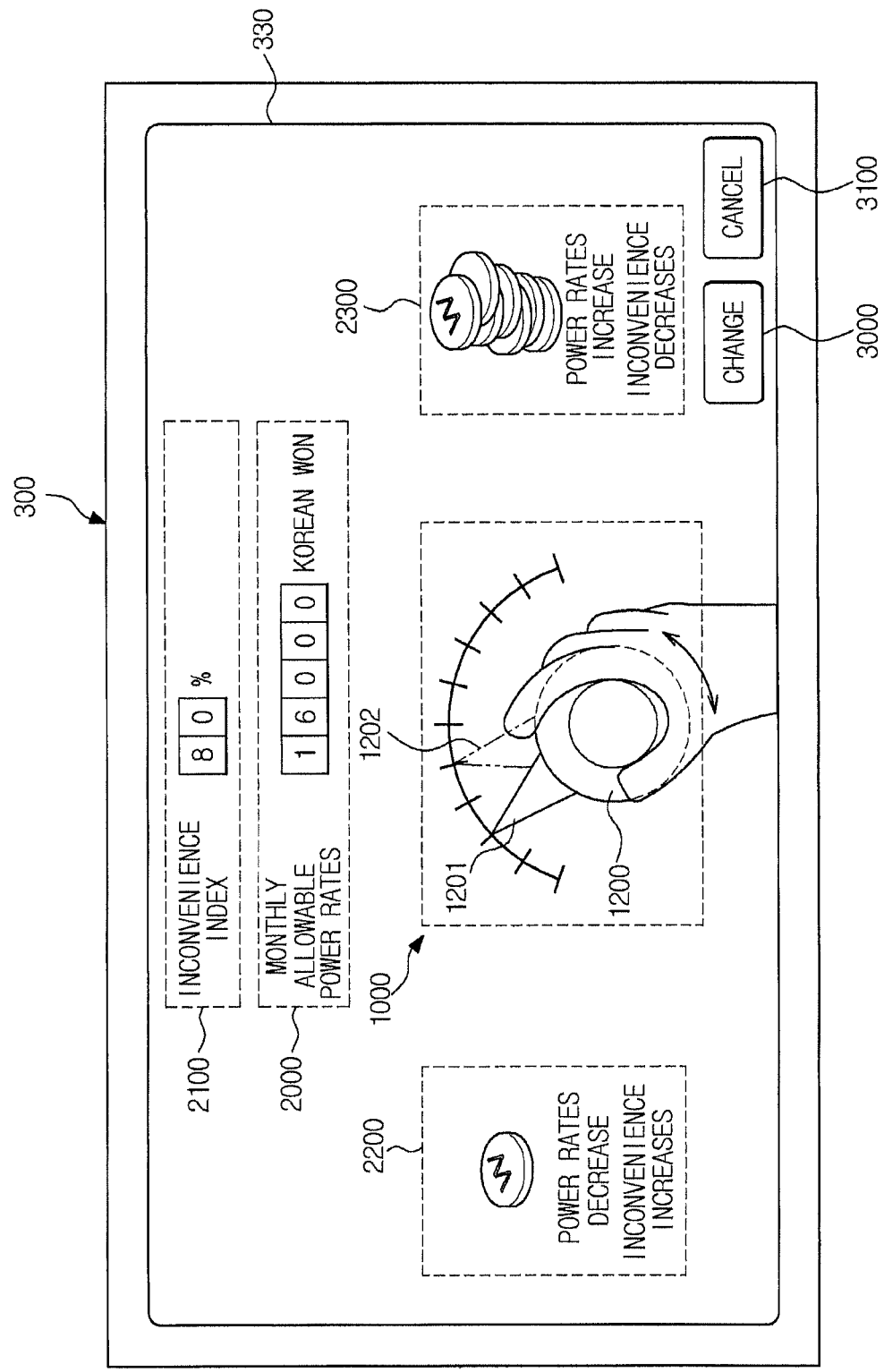
FIGS. 5A and 5B are views explaining an operation of inputting a weighted index through a rotary dial type GUI element for inputting a weighted index and displaying an inconvenience index depending on the input weighted index in the energy management apparatus of the energy management system according to an embodiment.
Figure 5B:
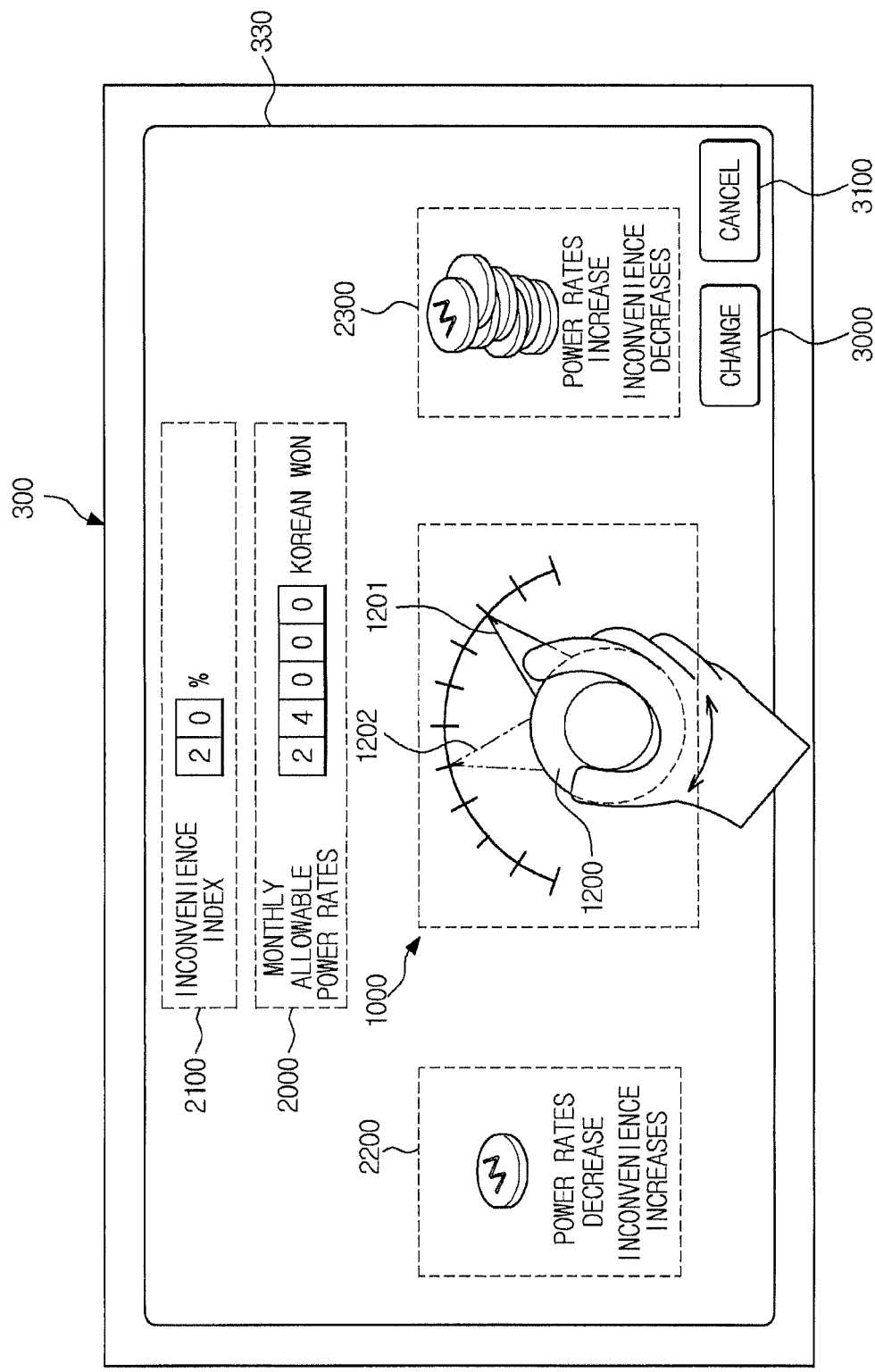

FIGS. 5A and 5B are views for explaining an operation of inputting a weighted index through a rotary dial type GUI element for inputting a weighted index and displaying an inconvenience index depending on the input weighted index in the EMS of the energy management system according to an embodiment.

As shown in FIGS. 5A and 5B, the GUI element 1100 may be a rotary dial 1200 having an indicator 1201 instead of the slide bar 1101.

In this case, the user inputs a weighted index by rotating the rotary dial displayed on the screen 330, and thus an inconvenience index depending on the input weighted index is indicated. Here, an indicator 1202 that is in a dotted line form and represents a recommended value may be indicated on a movement section of the indicator 1201 of the rotary dial 1200, as in the example shown in FIGS. 4A and 4B.

Figure 6B:
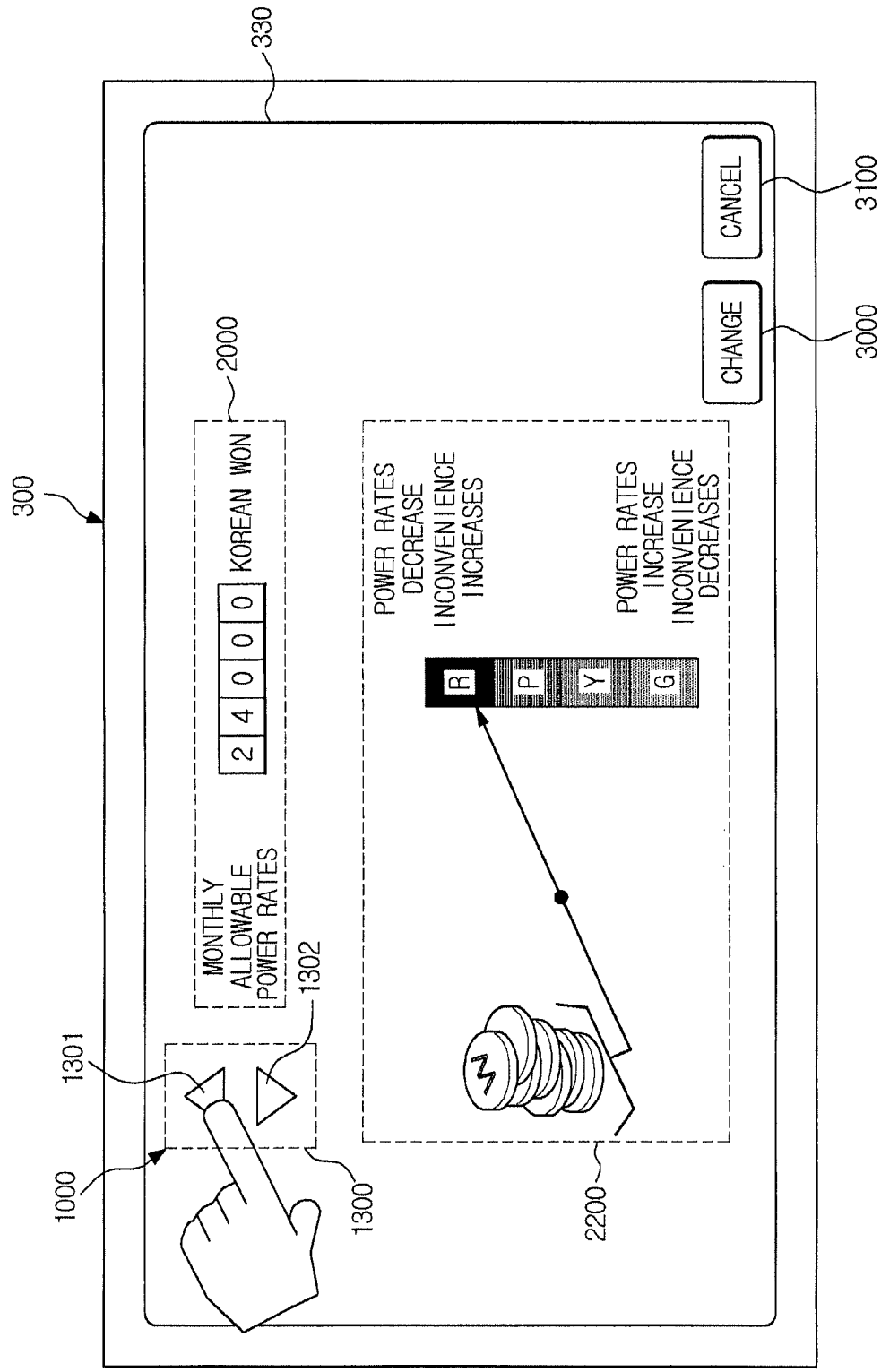

FIGS. 6A and 6B are views for explaining an operation of inputting power rates through a control button type GUI element for inputting power rates and displaying an energy use index depending on the input power rates in the energy management apparatus of the energy management system according to an embodiment.

As shown in FIGS. 6A and 6B, the GUI element 1000 may be a control button 1300 having an increase key 1301 and a decrease key 1302

In this case, the user may press the increase key 1301 and decrease key 1302 to directly input monthly allowable power rates instead of a desired weighted index In addition, instead of the inconvenience index depending on the monthly allowable power rates input by the user, an energy use index representing a degree by which the user uses energy is displayed on an energy use index indication element 2200.

The energy use index displayed on the energy use index indication element 2200 can be indicated in colors such as red, pink, yellow, and green, for example.

Power rates increase while inconvenience decreases as the energy use index increases and the power rates decrease while the inconvenience increases as the energy use index decreases, and thus the energy use index is displayed as a color.

For example, it can be implemented such that a scale is moved to indicate a red color when the energy use index has the highest value, and the scale is moved to indicate a green color when the energy use index has the lowest value.

Figure 7:
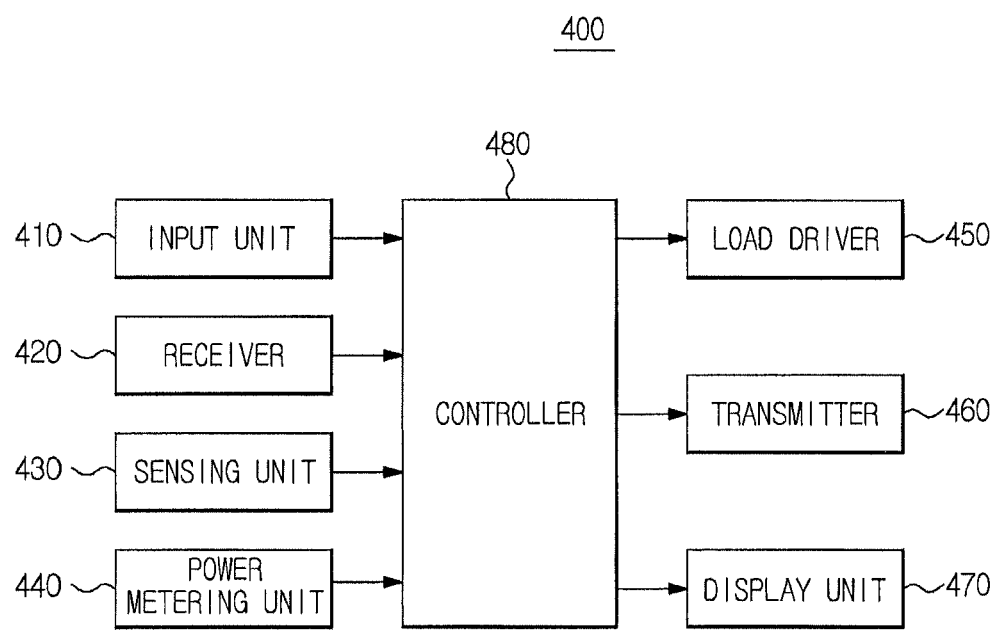
FIG. 7 is a block diagram of an electric device in the energy management system according to an embodiment.

FIG. 7 is a block diagram of an electric device 400 in the energy management system according to an embodiment.

Referring to FIG. 7, the electric device 400 includes an input unit 410, a receiver 420, a sensing unit 430, a power metering unit 440, a load driver 450, a transmitter 460, a display unit 470, and a controller 480.

The input unit 410 is an interface through which the user inputs an instruction. The interface may include a keypad, a keyboard, a joy stick, a touch pad, and/or a button, for example. Particularly, the input unit 410 may be integrated with the display unit 470 to be configured in the form of a touch screen.

The receiver 420 receives energy level information from the EMS 300.

The sensing unit 430 senses various states of the electric device 400. If the electric device 400 is an inductive heating cooking device, the electric device 400 includes sensors for sensing various states of the induction heating cooking device, such as a temperature sensor and a voltage sensor, for example. If the electric device 400 is an air conditioner, the electric device 400 includes sensors for sensing various states of the air conditioner, such as an indoor temperature sensor, an outdoor temperature sensor, and an evaporator temperature sensor, for example. Furthermore, if the electric device 400 is a refrigerator, it includes sensors for sensing various states of the refrigerator, such as an internal temperature sensor, an evaporator temperature sensor, and a discharge temperature sensor, for example.

The power metering unit 440 meters the amount of electric power consumed by the electric device 400 at predetermined intervals.

The load driver 450 drives the electric device 400.

The transmitter 460 transmits information regarding the electric device 400 to the EMS 300. For example, the transmitter 460 transmits a power consumption amount of the electric device 400, metered by the power metering unit 440, to the EMS 300.

The display unit 470 displays an operating state of the electric device 400 or displays energy level information and various operation states.

The controller 480 controls components of the electric device 400.

The controller 480 receives energy level information provided by the EMS 300 and controls the load driver 450 on the basis of the received energy level information to control the electric device 400 to operate at an energy level corresponding to the energy level information.

For example, the controller 480 may change an energy level of an inductive heating cooking device based on the energy level information received from the EMS 300 when the electric device 400 is the induction heating cooking device. Accordingly, an output level of a working coil for heating a container is changed.

If the electric device 400 is an air conditioner, the controller 480 changes an energy level of the air conditioner based on the energy level information received from the EMS 300. Accordingly, a temperature value set in the air conditioner is changed, a defrost time is changed, or a compressor operation time is changed.

If the electric device 400 is a refrigerator, the controller 480 changes an energy level of the refrigerator based on the energy level information received from the EMS 300. Accordingly, a chilling temperature value or a freezing temperature value set in the refrigerator is changed, or a defrost time is varied.

In addition, the controller 480 controls the display unit 470 to display current energy level information such that the user can confirm a current energy level. Here, the controller 480 controls the display unit 470 to display information regarding power rate benefit or whether inconvenience is increased when the current energy level is used as the reference energy level.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of interfacing with an energy management apparatus controlling an energy level of an electric device, the method comprising:
    displaying, on a screen, a graphical user interface (GUI) element for a user to input a weighted index, which represents a relative increase or decrease between power rates and inconvenience that the user experiences when using the electric device;
    receiving the weighted index that is input by the user through the displayed GUI element;
    determining an inconvenience index based on the weighted index that is input by the user through the GUI element on the screen; and
    displaying the determined inconvenience index that represents a degree of inconvenience, which the user experiences, as a number or a color when the electric device operates at the energy level,
    wherein the determined inconvenience index has a value proportional to a difference between the inputted weighted index and a preset reference weighted index.

2. The method according to claim 1, wherein the GUI element includes at least one of a slide bar and a rotary dial, and the weighted index is input by using the slider bar or the rotary dial.

3. The method according to claim 2, further comprising:
    displaying inconvenience information that comprises indicating a recommended value on a manipulating path of the slide bar or rotary dial to help the user to input the weighted index using the GUI element.

4. The method according to claim 3, wherein the recommended value includes at least one of an average weighted index of users in a same environment and an average of weighted indexes used by the user for a predetermined period of time.

5. The method according to claim 3, wherein the recommended value includes at least one of average power rates of users in a same environment and an average of power rates paid by the user.

6. The method according to claim 1,
    wherein the determined inconvenience index has a lower value when the inputted weighted index is higher than the preset reference weighted index and has a higher value when the inputted weighted index is lower than the preset reference weighted index.

7. The method according to claim 1, further comprising:
    displaying, on the screen, the GUI element for the user to input a monthly allowable power rate;
    receiving the monthly allowable power rate from the user that is input by the user through the displayed GUI element; and
    wherein the determined inconvenience index is also based on the inputted monthly allowable power rate, and
    wherein the determined inconvenience index has a low value when the inputted monthly allowable power rate is higher than a preset reference power rate and has a high value when the inputted monthly allowable power rate is lower than the preset reference power rate.

8. The method according to claim 7, wherein the preset reference power rate corresponds to one or more of the inputted monthly allowable power rate generated when the electric device is operated at a desired time and the inputted monthly allowable power rate generated when the electric device is used regardless of variable power rates.

9. The method according to claim 7, wherein the GUI element includes a control button, and the monthly allowable power rate is input by using the control button.

10. The method according to claim 7,
    wherein the determined inconvenience index includes an energy use index that represents a degree of inconvenience that the user experiences as a color, and
    wherein the energy use index is indicated in a first color when the inputted monthly allowable power rate exceeds the preset reference power rate and is indicated in a second color when the inputted monthly allowable power rate is below the preset reference power rate.

11. The method according to claim 10, wherein the first color is red and the second color is green.

12. A non-transitory computer readable medium storing computer readable instructions that control at least one processor to implement the method of claim 1.

13. The method according to claim 1, wherein the value of the inconvenience index decreases proportionally as the difference between the inputted weighted index and the preset reference weighted index decreases and the value of the inconvenience index increases proportionally as the difference between the inputted weighted index and the preset reference weighted index increases.

14. A method of interfacing with an energy management apparatus controlling an energy level of an electric device, the method comprising:
    receiving a weighted index, which is input by a user, that represents a relative increase or decrease between power rates and inconvenience that the user experiences when using the electric device;

determining an inconvenience index based on the inputted weighted index; and displaying the determined inconvenience index representing a degree of inconvenience, which the user experiences, as a number or a color when the electric device operates at the energy level which is determined on the basis of the inputted weighted index, wherein the determined inconvenience index has a value proportional to a difference between the inputted weighted index and a preset reference weighted index.

15. A non-transitory computer readable medium storing computer readable instructions that control at least one processor to implement the method of claim 14.

16. An energy management apparatus controlling an energy level of an electric device, comprising:

a screen to display a graphical user interface (GUI) element for inputting a weighted index, which represents a relative increase or decrease between power rates and inconvenience that a user experiences when using the electric device; and a controller to receive the weighted index from the user through the displayed GUI element, and to determine and display an inconvenience index representing a degree of inconvenience, which the user experiences, as a number or a color when the electric device operates at the energy level, wherein the inconvenience index is determined on the basis of the weighted index that is input by the user through the GUI element on the screen, and wherein the inconvenience index has a value proportional to a difference between the weighted index that is input by the user and a preset reference weighted index.

17. The energy management apparatus according to claim 16, wherein the GUI element of the screen corresponds to at least one of a slide bar and a rotary dial through which the weighted index is input.

18. The energy management apparatus according to claim 17, wherein the controller controls the inconvenience index to decrease as the inputted weighted index exceeds the preset reference weighted index and to increase as the inputted weighted index is below the preset reference weighted index.

19. The energy management apparatus according to claim 17, wherein the controller controls the inconvenience index to decrease as the power rates exceed preset reference power rates and to increase as the power rates are below the preset reference power rates.

20. The energy management apparatus according to claim 19, wherein the preset reference power rates correspond to one or more of the power rates generated when the electric device is operated at a desired time and the power rates generated when the electric device is used regardless of variable power rates.

21. The energy management apparatus according to claim 16, wherein the controller controls a recommended value to be displayed on the screen to help the user to input the weighted index or power rates using the GUI element.

22. The energy management apparatus according to claim 21, wherein the recommended value includes at least one of an average weighted index of users in a same environment and an average of weighted indexes used by the user for a predetermined period of time.

23. The energy management apparatus according to claim 21, wherein the recommended value includes at least one of average power rates of users in a same environment and an average of power rates paid by the user.

24. The energy management apparatus according to claim 16, wherein the GUI element of the screen includes a control button by which the power rates are input.

25. The energy management apparatus according to claim 16, wherein the controller determines an energy use index, which represents a degree of inconvenience that the user experiences, as a color, and wherein the energy use index is indicated in a first color when the power rates exceed preset reference power rates and is indicated in a second color when the power rates are below the preset reference power rates.

26. The energy management apparatus according to claim 25, wherein the first color is red and the second color is green.

27. The energy management apparatus according to claim 16, wherein the screen is a touch screen.

28. A energy management system controlling an energy level of an electric device, comprising:

an input unit to receive a weighted index, which represents a relative increase or decrease between power rates and inconvenience that a user experiences when using the electric device;

a controller to determine an inconvenience index representing a degree of inconvenience, which the user experiences, as a number or a color when the electric device operates at the energy level, wherein the inconvenience index is determined on the basis of the received weighted index; and a display unit to display the inconvenience index according to a control signal from the controller, wherein the inconvenience index has a value proportional to a difference between the weighted index and a preset reference weighted index.

29. An electric device comprising:

a receiver that receives information regarding an energy level corresponding to a weighted index that represents a relative increase or decrease between power rates and inconvenience of the electric device from an energy management apparatus that displays a graphic user interface (GUI) element for inputting the weighted index on a screen, receives the weighted index from a user through the displayed GUI element, determines the energy level corresponding to the inputted weighted index, and displays, on the screen, an inconvenience index representing a degree of inconvenience, which the user experiences, as a number or a color when the electric device operates at the determined energy level;

a controller that controls energy output of the electric device on the basis of information of the energy level received through the receiver, and that determines the inconvenience index based on the input weighted index; and a load driver that drives loads in response to a control signal of the controller, wherein the inconvenience index has a value proportional to a difference between the weighted index, which is input, and a preset reference weighted index.

30. A power management apparatus comprising:

an energy management apparatus including a screen that displays a graphic user interface (GUI) element for inputting a weighted index that represents a relative increase or decrease between power rates and inconvenience that a user experiences when using the electric device, and a controller that receives the weighted index from the user through the displayed GUI element, determines an energy level corresponding to the inputted weighted index, and displays an inconvenience index representing a degree of inconvenience, which the user experiences, as a number or a color when the electric device operates at the determined energy level on the screen; and an electric device including a receiver that receives information regarding the determined energy level, a controller that controls energy output of the electric device on the basis of information of the determined energy level received through the receiver, and a load driver that drives loads in response to a control signal of the controller, wherein the inconvenience index has a value proportional to a difference between the weighted index, which is input by the user, and a preset reference weighted index.

31. The energy management apparatus according to claim 30, wherein the screen is a touch screen.

\* \* \* \* \*